United States Patent [19]

Spear et al.

[11] Patent Number: 4,706,273
[45] Date of Patent: Nov. 10, 1987

[54] CELLULAR TELEPHONE

[75] Inventors: A. Gil Spear, Vero Beach, Fla.; Anthony P. Palett, 31458 Hunters Cir., Farmington Hills, Mich. 48018

[73] Assignee: Anthony P. Palett, Farmington Hills, Mich.

[21] Appl. No.: 798,101

[22] Filed: Nov. 14, 1985

[51] Int. Cl.$^4$ .......................... H04Q 7/04; H04M 1/21
[52] U.S. Cl. ...................................... 379/58; 379/428; 379/110
[58] Field of Search ................ 179/90 K; 379/58, 59, 379/428, 432, 434, 110

[56] References Cited

U.S. PATENT DOCUMENTS

| | | | |
|---|---|---|---|
| 2,097,419 | 10/1937 | Schmidt | 350/277 |
| 2,181,324 | 11/1939 | Glover | 40/10 R |
| 2,211,879 | 8/1940 | Cave | 281/45 |
| 2,803,902 | 8/1957 | Shedd | 40/107 |
| 3,258,541 | 6/1966 | Hopkins | 379/364 |
| 4,056,696 | 11/1977 | Meyerle et al. | 379/419 |
| 4,291,201 | 9/1981 | Johnson et al. | 379/368 |
| 4,558,178 | 12/1985 | Yasuda et al. | 379/63 |

OTHER PUBLICATIONS

Millicom Cellular Portable Telephone Advertisement.

Whitney, J. C., & Co., Catalog No. 464B (Chicago, Ill.) p. 46.

Primary Examiner—Gene Z. Rubinson
Assistant Examiner—Mark E. Ham
Attorney, Agent, or Firm—Rhodes and Boller

[57] ABSTRACT

A compact cellular telephone for motor vehicles whose outer case is a vehicle sun visor. Operating controls for placing, receiving and processing incoming and outgoing calls are large and within the driver's normal field of vision so that the invention may be operated without distracting a driver's attention from the road. Controls for placing outgoing calls are positioned in a linear arrangement across the front surface of the lower case. Controls for selecting functions, also in a linear arrangement, are positioned on the lower surface of the case in parallel relationship to the outgoing call controls. All electronic components and circuitry of the telephone are mounted on a single printed circuit board in the interior of the case. An input jack is provided on the lower surface of the case for the optional use of a driver's headset in lieu of a microphone and speaker which are mounted in the interior of the case. Alternate embodiments of the invention provide the optional features of a telephone number index, travel expense log and vanity mirror.

23 Claims, 18 Drawing Figures

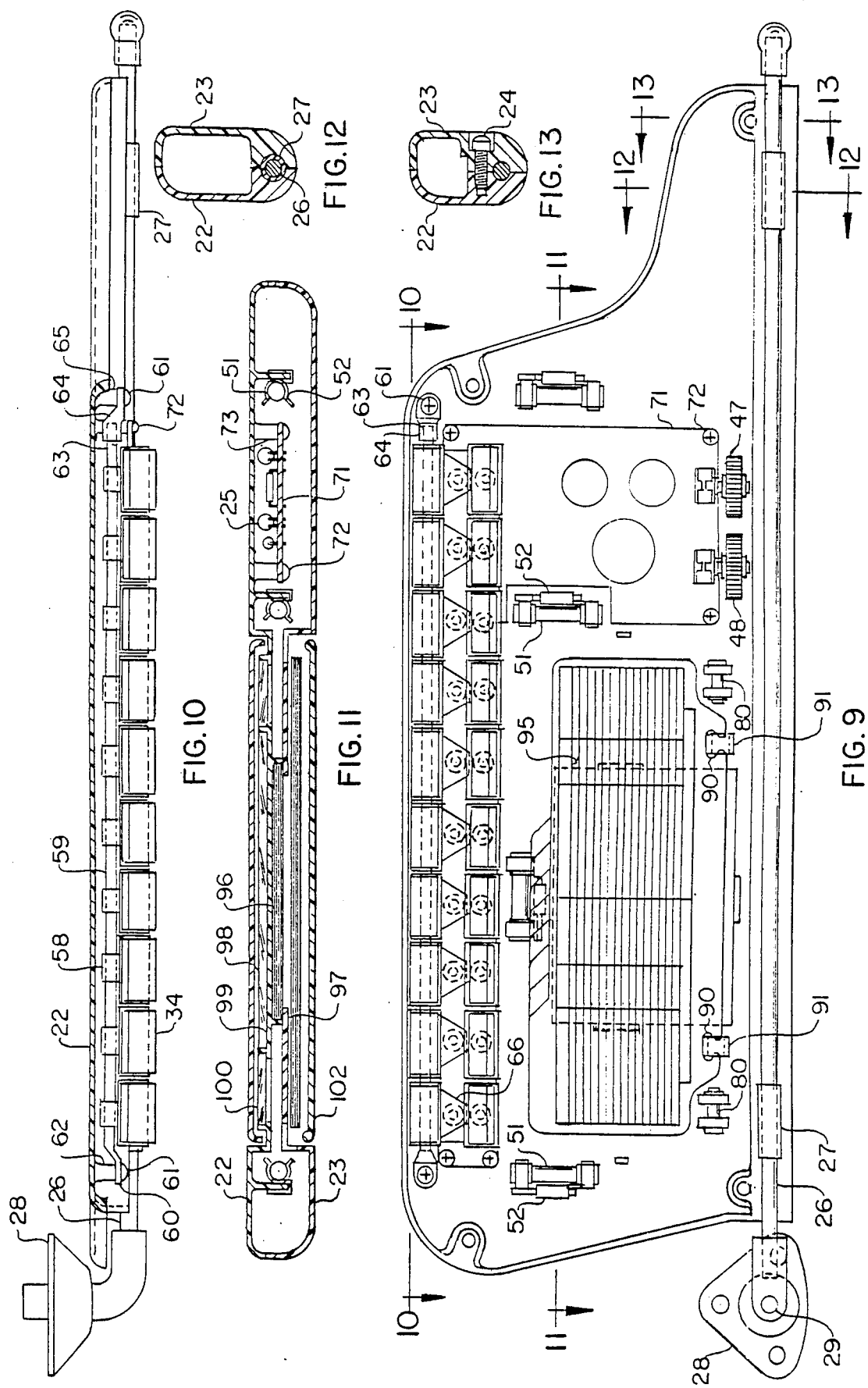

CELLULAR TELEPHONE

BACKGROUND OF THE INVENTION

The mobile cellular telephone provides high quality service at affordable prices to more subscribers than heretofore possible. The basic concept of the cellular telephone is to increase the number of mobile telephone units by dividing a service area into regions called cells and reducing the power of transmission. The various cells are linked together by a central switching office which receives and transmits information in digital form between the mobile units.

Many believe cellular telephones will soon be as common as the residential and office telephone. Cellular telephones are becoming part of the standard equipment of physicians, salespersons, truckers, repairmen, busy executives and the like.

Current cellular telephones are patterned after home and office equipment and are difficult to locate in motor vehicles. Crowded conditions which exist in vehicle interiors result in a need for concepts in cellular telephones which conserve space in the vehicle interiors. Moreover, automotive safety has been reduced by their current locations, e.g., instrument panels and front seat center arm rests, being outside a driver's straight ahead field of vision for observing the road. The attention of drivers has been further distracted by providing controls which are poorly arranged, difficult to read and of inadequate size.

The current equipment is further deficient by failing to accommodate a wide range of vehicle designs and sizes. In some cases equipment designs have required substantial vehicle modifications for their adaptation to motor vehicles. The lack of accommodation has increased new model investment costs as well as manufacturing costs.

The application of the cellular telephone to motor vehicles has created a need for telephone number indexes, thereby further congesting the already crowded vehicle interiors. It will be apparent that the space problems will become even more acute if manufacturers continue to downsize their vehicles to improve fuel economy for fuel conservation and reductions in the cost of vehicle ownership. Moreover, existing telephone number indexes further distract the attention of drivers from the road.

Increased demands by government and employers for travel expense records has created an unfilled need for improved portable devices for recording these expenses. Travel expense recording devices are needed which are readily accessible to motorists and easy to use.

With the foregoing in mind, a compact, easy to use cellular telephone for motor vehicles which is universally adaptable, improves vehicle safety and provides optional features for recording telephone numbers and travel expenses would provide important benefits and fill existing needs.

SUMMARY OF THE INVENTION

The present invention is directed to a mobile telephone and more particularly to a compact mobile telephone for a driver of a motor vehicle which is housed in a vehicle sun visor.

One feature of the invention is its compact size which makes it adaptable to a wide range of vehicle designs and sizes.

Another feature is the location of the operating controls in a driver's field of vision for observing the road.

Another feature is its large, conveniently arranged and easy to read operating controls.

Another feature is an optional provision for recording telephone numbers.

Another feature is an optional provision for recording travel expenses.

Another feature is an optional vanity mirror.

The sun visor configured outer case consists of an upper housing and a lower housing, detachably joined to the upper housing. A single row of rectangular push buttons, in clear view of the driver, is provided on the front surface of the lower case for selecting telephone numbers of outgoing calls. Directly behind the call buttons, also in clear view of the driver, is a row of rectangular push buttons, for selecting operating functions, and rotary controls for adjusting the volumes of incoming calls and a buzzer. All of the controls are rather large in size and identified with easy to read characters.

It is a primary object of the present invention to provide a compact cellular telephone for motor vehicles which is universally adaptable to existing vehicle designs and sizes.

It is another object, in addition to the foregoing object, to provide a cellular telephone which has its operating controls in the direct line of sight of a driver so as not to diminish vehicle safety by distracting the driver's attention from the road.

It is another object, in addition to the foregoing objects, to provide a cellular telephone which is convenient and easy to use.

It is another object, in addition to the foregoing objects, to provide in combination with a mobile cellular telephone a compact, convenient and easy to use means for storing telephone numbers.

It is another object, in addition to the foregoing objects, to provide in combination with a cellular telephone a compact, convenient and easy to use means for recording travel expenses.

The foregoing objects, features and benefits of the present invention, together with additional objects, features and benefits, will be apparent from the ensuing description which discloses the invention in detail. A preferred embodiment is described which discloses the best mode contemplated in carrying out the invention and the subject matter in which exclusive rights are claimed is set forth in the claims which are appended thereto.

BRIEF DESCRIPTION OF THE DRAWINGS

FIG. 9 is a bottom view of the cellular telephone with the lower housing removed.

FIG. 10 is a sectional view taken on the line 10—10 of FIG. 9.

FIG. 11 is a sectional view taken on the line 11—11 of FIG. 9.

FIG. 12 is a sectional view taken on the line 12—12 of FIG. 9.

FIG. 13 is a sectional view taken on the line 13—13 of FIG. 9.

DESCRIPTION OF THE PREFERRED EMBODIMENT

Figure 1:
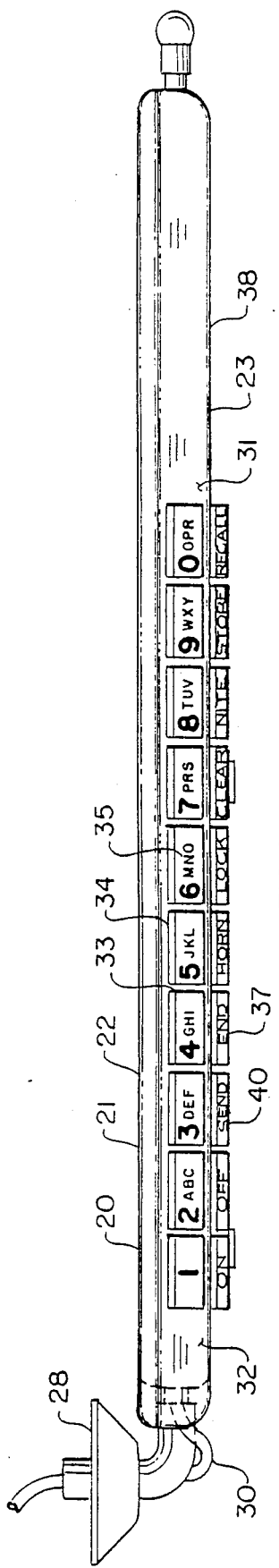
FIG. 1 is a front view of a cellular telephone for a motor vehicle.

Referring now to the drawings wherein like numerals refer to like and corresponding parts throughout the several views, the present invention 20 comprises a cellular telephone 20 for motor vehicles housed in a vehicle sun visor 19. Several optional features are provided which will be herein described.

The sun visor 19, which is the outer case 21 of the telephone 20, is preferably molded from a resilient plastic material and consists of an upper housing 22 and a lower housing 23, detachably joined to the lower housing 23 by several threaded fasteners 24. The case 21 may be covered with a sheet of leather or soft plastic material (not shown). In the interior of the case 21 are the electronic components 25 of a conventional cellular telephone for transmitting and receiving outgoing and incoming messages.

Figure 2:
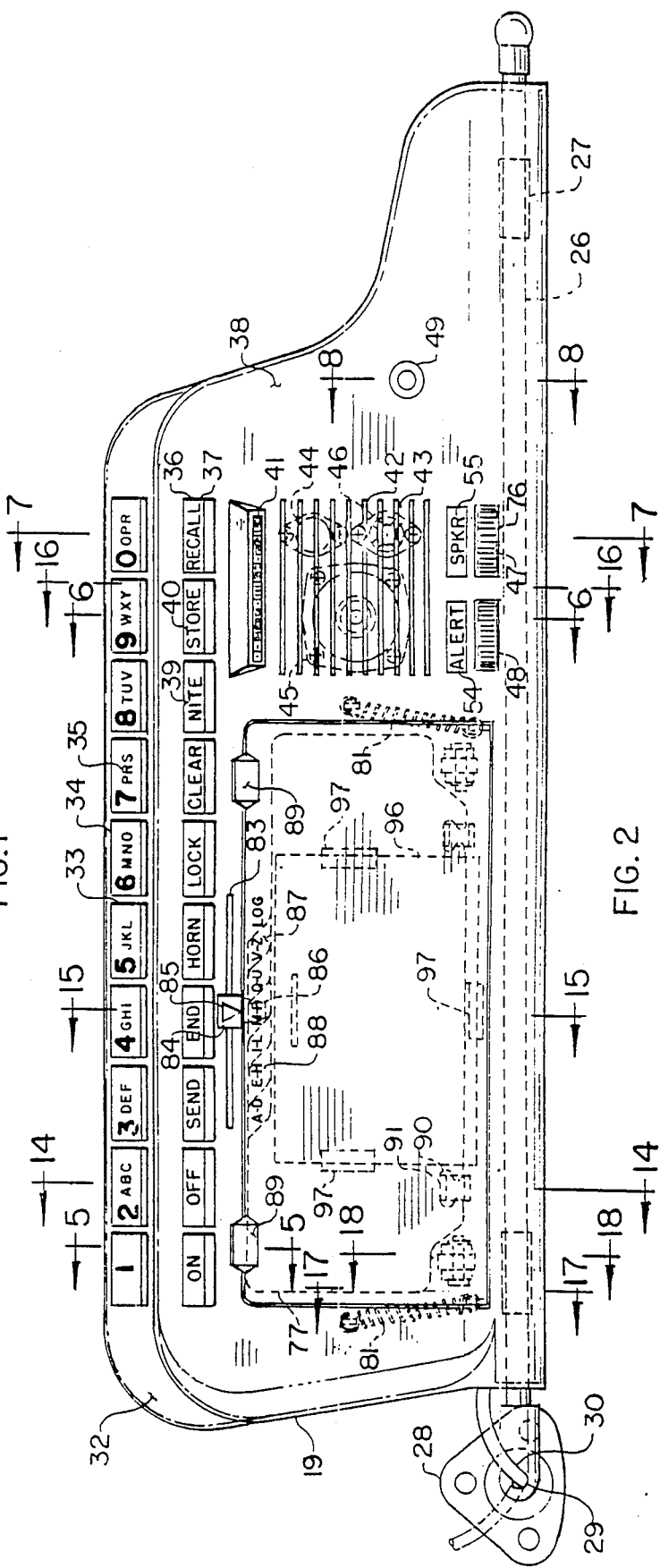
FIG. 2 is a bottom view of the cellular telephone.
Figure 8:
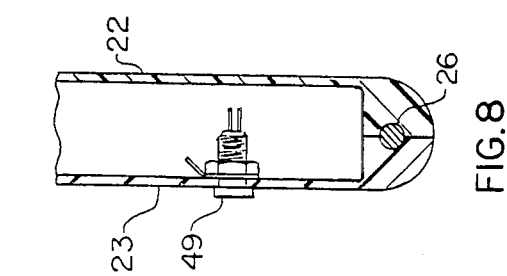
FIG. 8, is a rear view of the cellular telephone.
Figure 7:
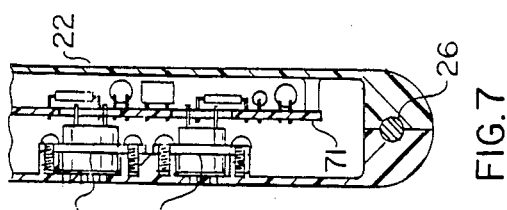
FIG. 7 is a sectional view drawn to an enlarged scale taken on the line 7—7 of FIG. 1.
Figure 6:
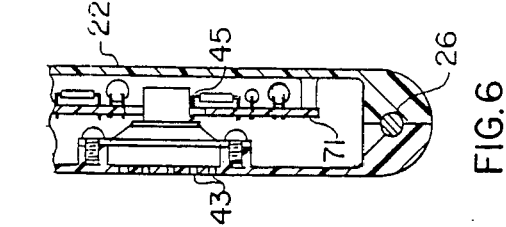
FIG. 6 is a sectional view drawn to an enlarged scale taken on the line 6—6 of FIG. 1.
Figure 5:
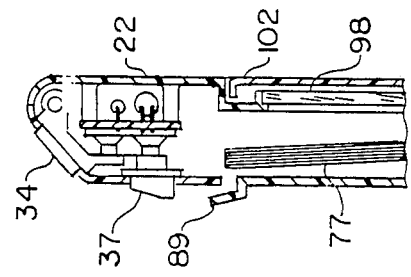
FIG. 5 is a sectional view drawn to an enlarged scale taken on the line 5—5 of FIG. 1.

With reference to FIGS. 1 and 2, the cellular telephone 20 is mounted to the interior of a motor vehicle in the same manner as a conventional sun visor. There is provided a slender round pivot shaft 26 about which the outer case 21 is rotatable. The pivot shaft 26 extends laterally across the rear portion of the outer case 21 and is clamped between the upper 22 and lower 23 housings. Around the pivot shaft 26 is a pair of resilient sleeves 27 which provide a predetermined amount of friction to maintain the telephone 20 in a desired angular position about the pivot shaft 26. The right end portion of the pivot shaft 26 is joined to a triangular mounting flange 28 for attaching the telephone 20 to a vehicle body. The mounting flange 28 has an aperture 29 for routing electrical wiring 30 which connects the cellular telephone 20 to a power source and an antenna (not shown).

The front wall 31 of the lower housing 23 has an angular portion 32 wherein are located rectangular apertures 33. The angular portion 32 extends substantially across the width of the lower housing 23 and rectangular push buttons 34, marked with alphanumeric characters 35, project outwardly through the apertures 33, for placing outgoing telephone calls.

Directly rearward, in parallel relationship with the outgoing call buttons 34, is a second row of rectangular apertures 36 and outwardly projecting push buttons 37, extending across the lower wall 38 of the lower housing 23. The buttons 37 have angular faces 39, marked with alphabetic characters 40, to designate the functions of the buttons 37.

Referring again to FIG. 1, on the left side of the lower housing 23 there is provided a digital display unit 41 for visually indicating the telephone numbers of the outgoing calls. The digital display unit 41 is a conventional optoelectronic type display, such as, a 14-segment display of light-emitting diodes. The digital display 41 is interiorally mounted to the lower wall 38 of the lower housing 23. Rearward of the digital display 41 is a plurality of slots 42 which form a grille 43 in the lower housing 23. The slots 42 communicate with an outgoing message microphone 44, incoming message speaker 45, and incoming call buzzer 46 which are interiorally mounted to the lower wall 38 of the lower housing 23.

Rearward of the grille 43 is a rotary control 47 for adjusting the volume of an incoming call and a second rotary control 48 for adjusting the volume of the buzzer 46. To the left of the speaker volume control 47 is an input jack 49 for an optional driver's headset (not shown) in lieu of the incoming message speaker 45 and outgoing message microphone 44. The driver's headset is beneficial when the telephone 20 is operated under noisy conditions, such as, heavy highway traffic.

From FIGS. 1 and 2, it will be appreciated that the location, arrangement, size and labelling of the controls 34, 37, 47 and 48 add a measure of safety since a driver can easily operate them while directing his attention to the road. This is so because the controls 34, 37, 47 and 48 are positioned in the driver's field of vision. Moreover, they are large in size, easy to read and adequately spaced.

Figure 14:
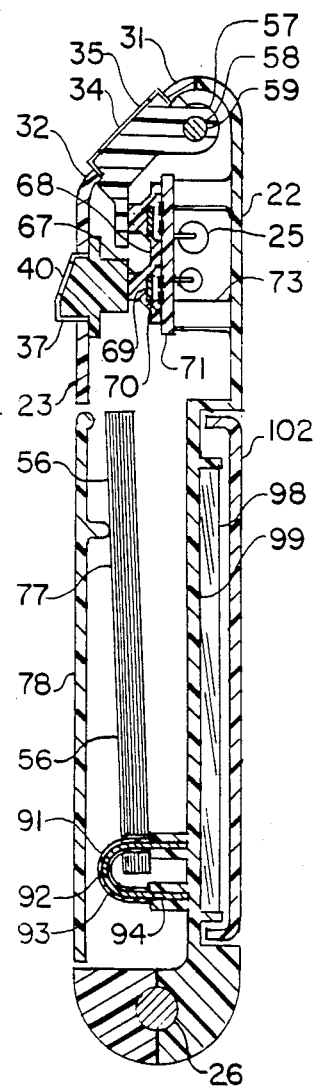
FIG. 14 is a sectional view drawn to an enlarged scale taken on the line 14—14 of FIG. 1.

The constructions of the outgoing call buttons 34 and the function buttons 37 are best understood by referring to FIGS. 9 and 14. The call buttons 34 and the function buttons 37 are preferably molded from a plastic material which is suitable for transmitting light to their indicia 35 and 40 from lamps 51 in the interior of the case 21. The lamps 51, which are retained in sockets 52, removably attached to the upper housing 22, also illuminate the indicia 54 and 55 of the rotary volume controls 47, 48, an optional telephone number index 56 and a vanity mirror 98. The lamps 51 are preferably connected to a vehicle instrument panel lighting circuit (not shown) whereby the lamps 51 are illuminated with the instrument panel lights (not shown) in the usual manner by a headlamp switch (not shown) and varied in intensity by an instrument panel lighting dimmer switch (not shown).

The front portions of the outgoing call buttons 34 are bosses 57 with transverse apertures 58 for pivotally mounting the buttons 34 to a slender round rocker shaft 59 which is fixedly attached to the upper housing 22. The right end portion of the rocker shaft 59 is formed into an apertured tab 60 and attached with a threaded fastener 61 to a boss 62 which extends downwardly from the inner surface of the upper housing 22. The left end portion is a straight portion 63 to permit the assembly of the buttons 34 onto the rocker shaft 59. After the buttons 34 are assembled onto the rocker shaft 59, a plastic bushing 64 is engaged with the straight left end portion 63 and attached with a threaded fastener 61 to another boss 65 which extends downwardly from the inner surface of the upper housing 22.

With reference to FIG. 9, triangular inner portions 66 of the outgoing call buttons 34 engage circular projections 67 of an elastic contact plate 68 of a rubber-like material. A circular contact 69 of a conducting material is bonded to the upper end of each circular projection 67 of the elastic contact plate 68.

When an outgoing call button 34 is depressed, the button 34 rotates about the rocker shaft 59, causing the elastic contact plate 68 to locally deflect the circular contact 69, corresponding to the depressed button 34, to contact a pair of conductors 70 on a printed circuit board 71. The contact with the printed circuit board 71 converts the action into a digital signal which is transmitted to a remote central switching office (not shown). When the button 34 is released, the elastic contact plate 68 returns to its original shape and contact is broken. Except for straight line motion in lieu of rotation, when a function button 37 is depressed, a similar action results to initiate the function.

The construction of the printed circuit board 71 is shown in FIGS. 9, 11 and 14. The board 71 carries the components and circuitry 25 of the cellular telephone 20. It is a single piece L-shaped board 71, fixedly mounted with threaded fasteners 72 to bosses 73 which extend downwardly from the inner surface of the upper housing 22. The rotary controls 47 and 48 for adjusting volumes of incoming messages and the buzzer 46 are located on the lower rear portion of the board 71 and project through slots 76 in the lower housing 23 for access by the driver. As will be observed, the arrangement of the controls 34, 37, 47 and 48 results in both simplification and cost savings by permitting the use of a single printed circuit board 71.

Figure 4:
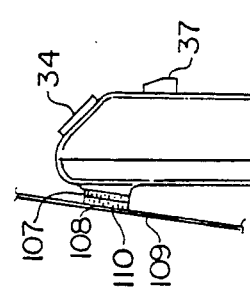
FIG. 4 is a right side view showing the cellular telephone with an open cover in the operating position of the telephone wherein the telephone is in confronting relationship to a vehicle headliner and the controls of the telephone are disposed in the occupant facing portion of a sun visor of the cellular telephone.

The optional telephone number index 56 is best understood by reference to FIGS. 1, 9, 14, 17 and 18. In the interior of the case 21 is a plurality of index cards 77 for recording telephone numbers. A cover 78, for obtaining access to the index cards 77, is pivotally attached to the lower housing 23 by forcibly engaging a pair of notched bosses 79 at the rear portion of the cover 78 with pivot pins 80 mounted in the upper housing 22. The open position of the cover 78, as shown in FIG. 4, provides an auxiliary sun visor when the cellular telephone 20 is in operation and at its uppermost position on the pivot shaft 26.

The cover 78 is retained in the open and closed positions by a pair of extension springs 81 which are attached to the cover 78 and the lower housing 23. When the cover 78 is manually rotated to the open and closed positions, the spring forces act on opposite sides of the cover pivot axis 82 and maintain the cover 78 in the maximum open and closed positions.

At the forward portion of the lower housing 23 a slotted aperture 83 receives a slideable control knob 84 for selecting an index card 77 from the plurality of cards 77 in the interior of the case 21. On the front surface of the slideable control knob 84 is a raised pointer 85 which is aligned with a release tang 86, suitably attached to the inner end portion of the control knob 84.

The tang 86 overlaps tab portions 87 of the index cards 77 whereby when the pointer 85 is aligned with an alphabetic character 88 on the cover 78, if the cover 78 is manually rotated downwardly with the finger tabs 89, the index cards 77 not retained by the release tang 86 will rotate downwardly and expose the card 77 corresponding to the selected alphabetic character 88 to the user's view. In the lower portion of each of the cards 77 is a pair of T-notches 90 which engage a pair of spaced apart D-rings 91 attached to the upper cover 22.

With reference to FIG. 14, each of the D-rings 91 is formed from a strip of metal 92 and is preferably partially covered with a thin layer of plastic 93. Exposed end portions of the metal strip 92 are press fitted into slots 94 of the upper housing 22. To conserve space for optional features such as a travel expense log 96 and vanity mirror 98, the number of index cards 77 is minimized by dividing each card 77 into two sections 95 for recording names and corresponding telephone numbers.

Figure 15:
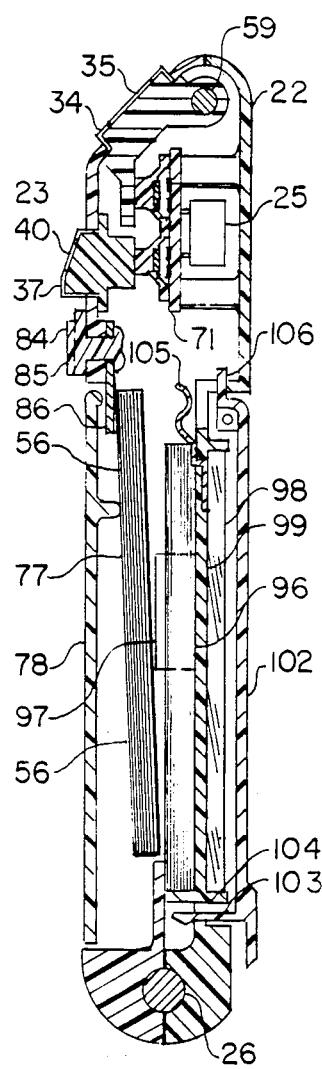
FIG. 15 is a sectional view drawn to an enlarged scale taken on the line 15—15 of FIG. 1.
Figure 16:
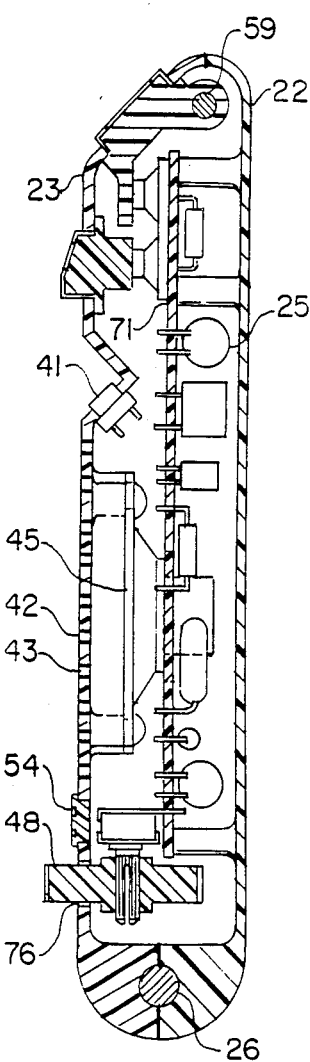
FIG. 16 is a sectional view drawn to an enlarged scale taken on the line 16—16 of FIG. 1.
Figure 17:
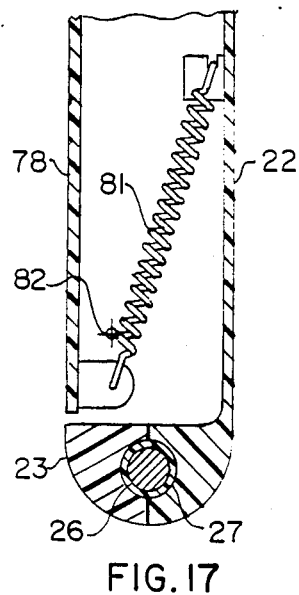
FIG. 17 is a sectional view drawn to an enlarged scale taken on the line 17—17 of FIG. 1.
Figure 18:
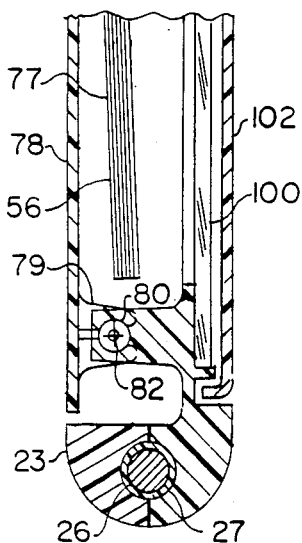
FIG. 18 is a sectional view drawn to an enlarged scale taken on the line 18—18 of FIG. 1.

Referring now to FIGS. 9 and 15, directly above the index cards 77 is a travel expense log 96 which is a gummed pad having a plurality of sheets for recording such items as fuel, lodging and meal expenses. The expense log 96 is retained to the upper cover 22 by L-brackets 97 formed by the upper 22 and lower 23 housings. The expense log 96 is accessible by moving the index slide control 84 to the extreme left position where all of the index cards 77 are released and rotate downwardly from the upper housing 22 to expose the expense log 96.

Figure 3:
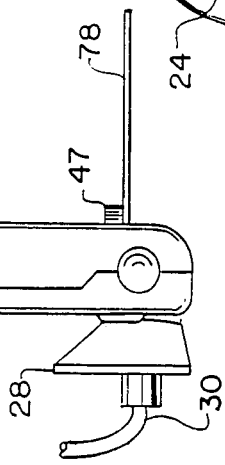
FIG. 3 is a top view of the cellular telephone.

The construction of the optional vanity mirror 98 is best understood by reference to FIGS. 3, 11 and 15. In the upper housing 22 there is provided a recess 99 for receiving the mirror 98. The mirror 98 is adhesively attached to the housing 22 or by other suitable means. Adjacent to each side of the mirror 98 is a lens 100 for transmitting light from the lamps 51 in the interior of the case 21. A cover 102 is pivotally attached to the upper housing 22 which encloses the mirror 98 when the mirror 98 is not in use.

The mirror cover 102 is retained in the closed position by engagement of an integral inward extending finger 103 with a slot 104 in the upper housing 22 and retained in the open position by the engagement of a spring clip 105 attached to the upper housing 22 and a tab 106 on the rearward edge of the cover 102.

With reference to FIGS. 3 and 4, there is provided on the upper housing 22 one member 107 of an optional hook and loop type fastener 108, commonly called by its tradename "Velcro". The other member 110 of the fastener 108 is fixedly attached to the headliner 109 of an automobile. The purpose of the hook and loop type fastener 108 is to support the additional weight of the telephone 20 so it will not tend to rotate downwardly.

Although but a single embodiment of our invention has been disclosed herein, it is obvious that changes will be made in the shape, size and arrangement of its details without departing from the spirit thereof.

We claim:

1. A compact mobile telephone for a motor vehicle comprising in combination:
   (a) a motor vehicle sun visor having a casing whose width and height exceed its thickness and which is selectively positionable to a shading position for shading an occupant of a motor vehicle and to a non-shading position wherein the width and height confront a headliner in the vehicle's interior and do not shade the occupant, said visor having an occupant facing portion in the non-shading position;
   (b) means for selectively positioning said sun visor to said shading and non-shading positions;
   (c) an array of telephone operating controls mounted on the said occupant facing portion of the sun visor, such that when the visor is in said non-shading position, said controls are in the occupant's field of vision and are rendered accessible for actuation by the occupant while the occupant's attention is directed to the road; and (d) electronic means mounted in the interior of said sun visor for transmitting, receiving and processing outgoing and incoming telephone calls.

2. The mobile telephone recited in claim 1 wherein said electronic means for transmitting, receiving and processing outgoing and incoming telephone calls are cellular telephone means.

3. The moble telephone recited in claim 1 further comprising a plurality of index cards pivotally mounted in said sun visor for recording and storing telephone numbers.

4. The mobile telephone recited in claim 1 further comprising a means mounted in said sun visor for recording travel expenses.

5. The mobile telephone recited in claim 1 further comprising a vanity mirror mounted in the portion of said sun visor which is in confronting relation to the headliner when said visor is in said non-shading position.

6. The mobile telephone recited in claim 1 further comprising a means mounted in said occupant facing portion of said sun visor when said visor is in the non-shading position, for visually displaying the telephone numbers of outgoing calls such that said display means is in the occupant's field of vision when his attention is directed to the road.

7. The mobile telephone recited in claim 1 further comprising a means for operatively connecting an external headset to the telephone.

8. The compact mobile telephone recited in claim 1 wherein said array of controls includes a linear arrangement of individual controls extending laterally across said occupant facing portion for placing outgoing telephone calls.

9. The mobile telephone recited in claim 8 wherein on said occupant facing portion of said sun visor there is a rearward inclining angular portion and said linear arrangement of controls for placing outgoing calls are located on said angular portion.

10. The compact mobile telephone recited in claim 8 further comprising a second linear arrangement of controls for other functions of said telephone extending laterally across said occupant facing portion, said second arrangement of controls being rearward of and in parallel relationship to said first linear arrangement of controls.

11. The compact mobile telephone recited in claim 1 further comprising:
(a) said casing having grill openings in said occupant facing portion for an incoming message speaker mounted in the interior of said visor; and
(b) an incoming message speaker mounted in the interior of said visor and disposed such that the output thereof is directed toward said grill openings.

12. The compact mobile telephone recited in claim 1 further comprising:
(a) said casing having grill openings in said occupant facing portion of said visor for an outgoing message microphone mounted in the interior of said visor; and
(b) an outgoing message microphone mounted in the interior of said visor, said microphone being disposed such that said microphone is responsive to messages from the occupant.

13. The compact mobile telephone recited in claim 1 wherein said casing comprises an upper and lower housings in said non-shaded position, said lower housing being detachably retained to said upper housing.

14. The mobile telephone recited in claim 1 further comprising audio means mounted in the interior of said sun visor for signalling when an incoming call is received.

15. The mobile telephone recited in claim 1 further comprising a means for illuminating said array of controls.

16. The mobile telephone recited in claim 13 wherein said means for mounting said sun visor to the interior of a vehicle maintains said visor in a selected position and comprises:
(a) a slender round pivot shaft about which said casing is rotatable;
(b) means for fixedly mounting said pivot shaft to the interior of the vehicle;
(c) at least one resilient sleeve surrounding said pivot shaft such that said sleeve provides friction to maintain said visor in a selected angular position about the pivot shaft;
(d) means for clamping said upper lower housings around said resilient sleeve.

17. A compact mobile telephone for a motor vehicle comprising in combination:
(a) a motor vehicle sun visor having a casing whose width and height exceed its thickness and which is selectively positionable to a shading position for shading an occupant of a motor vehicle and to a non-shading position wherein the width and height confront a headliner in the vehicle's interior and do not shade the occupant, said visor having an occupant facing portion in the non-shaping position;
(b) means for selectively positioning said sun visor to said shading and non-shading positions;
(c) an array of telephone operating controls mounted on the said occupant facing portion of the sun visor, such that when the visor is in said non-shading position, said controls are in the occupant's field of vision and are rendered accessible for actuation by the occupant while the occupant's attention is directed to the road;
(d) electronic means mounted in the interior of said sun visor for transmitting, receiving and processing outgoing and incoming telephone calls;
(e) a means mounted in said sun visor for recording and storing telephone numbers;
(f) a means mounted in said sun visor for recording travel expenses;
(g) a vanity mirror mounted in the portion of said sun visor which is in confronting relationship to the headliner when said visor is in the non-shading position; and
(h) a means mounted in said occupant facing portion of said sun visor for visually displaying the telephone numbers of outgoing calls such that said display means is in the occupant's field of vision when his attention is directed to the road.

18. In a compact mobile telephone mounted in a motor vehicle adjacent to the vehicle's headliner, of the type wherein the outer case of said telephone is a vehicle sun visor and said sun visor is selectively positionable to a position for shading a vehicle occupant and to a non-shading position wherein the portion of the visor which faces the occupant in the shading position is concealed and is in confronting relationship to the vehicle's headliner and the other portion of the sun visor is in facing relationship to the occupant the improvement which comprises at least one linear arrangement of individual controls extending laterally across the forward portion of said occupant facing portion for placing outgoing telephone calls, such that said telephone is operable in the non-shading position for placing outgoing calls and said controls are in the occupant's field of vision and accessible for actuation by said occupant when the occupant's attention is directed to the road.

19. The improvement in a mobile telephone set forth in claim 18 further comprising a cover rotatably mounted to said occupant facing portion for rotation about an axis, such that when the visor is in the non-shading position for operating said telephone said cover may be rotated away from said sun visor for use as an auxiliary visor.

20. In a compact mobile telephone mounted in a motor vehicle adjacent to the vehicle's headliner, of the type wherein the outer case of said telephone is a vehicle sun visor and said sun visor is selectively positionable to a position for shading a vehicle occupant and to a non-shading position wherein the portion of the visor which faces the occupant in the shading position is concealed and in confronting relationship to the vehicle's headliner and the other portion of the sun visor is in facing relationship to the occupant the improvement which comprises:

(a) a first linear arrangement of individual controls extending laterally across the forward portion of the sun visor facing the occupant when the sun visor is at the non-shading position, such that said controls are operable in the non-shading position and are in the occupant's field of vision and accessible for actuation by said occupant when the occupant's attention is directed to the road; and (b) a second linear arrangement of individual controls extending latertally across the forward portion of the sun visor facing the occupant in said non-shading position of said visor, said second arrangement of controls being in parallel relationship to said first linear arrangement, such that said controls are also in the occupant's field of vision and accessible for actuation by said ocupant when the occupant's attention is directed to the road.

21. The improvement in a mobile telephone set fourth in claim 20 wherein said first linear arrangement of individual controls is for placing outgoing telephone calls.

22. The improvement in a mobile telephone set forth in claim 20 wherein at least one of said linear arrangements of individual controls projects outwardly from the surface of the sun visor.

23. The improvement in a mobile telephone set forth in claim 20 further comprising a hook and loop type fastening means on the surface of the visor in confronting relationship to the headliner when said visor is in a non-shading position for preventing said visor from rotatng downwardly.

* * * * *